(12) United States Patent
Date et al.

(10) Patent No.: US 7,195,735 B2
(45) Date of Patent: Mar. 27, 2007

(54) POROUS SINTERED METAL AND FILTER THEREOF, AND METHOD FOR PRODUCING POROUS SINTERED METAL

(75) Inventors: Kenji Date, Shimane-ken (JP); Masumi Nakai, Shimane-ken (JP)

(73) Assignees: Hitachi Metals, Ltd., Tokyo (JP); HMY, Ltd., Shimane-ken (JP)

( * ) Notice: Subject to any disclaimer, the term of this patent is extended or adjusted under 35 U.S.C. 154(b) by 65 days.

(21) Appl. No.: 11/104,490

(22) Filed: Apr. 13, 2005

(65) Prior Publication Data

US 2005/0191199 A1 Sep. 1, 2005

(51) Int. Cl.
*B22F 3/12* (2006.01)

(52) U.S. Cl. .......................................... 419/2
(58) Field of Classification Search ............... 419/2
See application file for complete search history.

(56) References Cited

U.S. PATENT DOCUMENTS

| | | | | |
|---|---|---|---|---|
| 4,225,345 A | * | 9/1980 | Adee et al. | 419/36 |
| 4,283,360 A | * | 8/1981 | Henmi et al. | 264/669 |
| 4,765,950 A | * | 8/1988 | Johnson | 419/2 |
| 5,665,289 A | * | 9/1997 | Chung et al. | 264/628 |
| 5,678,163 A | * | 10/1997 | Rice | 419/2 |
| 5,846,664 A | * | 12/1998 | Third et al. | 428/550 |
| 5,963,771 A | * | 10/1999 | Chan et al. | 419/2 |
| 5,976,454 A | | 11/1999 | Sterzel et al. | |
| 6,117,592 A | | 9/2000 | Hoshino et al. | |
| 2004/0067152 A1 | * | 4/2004 | Kochanek | 419/2 |

FOREIGN PATENT DOCUMENTS

| | | |
|---|---|---|
| JP | 59-083972 | 5/1984 |
| JP | 2-160679 | 6/1990 |
| JP | 5-148504 | 6/1993 |
| JP | 10-140208 | 5/1998 |
| JP | 2001-271101 A | 10/2001 |

* cited by examiner

*Primary Examiner*—Ngoclan T. Mai
(74) *Attorney, Agent, or Firm*—Sughrue Mion, PLLC (57) ABSTRACT

A porous sintered metal comprising voids at least partially communicating with each other, and pores provided in walls of the voids, the porous sintered metal having a BET surface area of 700 $cm^2/cm^3$ or more, and an average diameter of the pores being 1 μm or more when measured by a mercury press-in method. The porous sintered metal is produced by blending a metal powder, a binder and resin particles to prepare a mixture in which the resin particles are dispersed; molding the mixture to provide a green body; selectively extracting the resin particles from the green body with a solvent; debinding the extracted green body by heating; and sintering the debound green body.

11 Claims, 9 Drawing Sheets
(8 of 9 Drawing Sheet(s) Filed in Color)

Fig. 1(a)

(SEM Photomicrograph) |—— 1 mm ——|

Fig. 1(b)

(Optical Photomicrograph) |—— 1 mm ——|

Fig. 2(a)

(SEM Photomicrograph) |—— 1 mm ——|

Fig. 2(b)

(Optical Photomicrograph) |—— 1 mm ——|

Fig. 3(a)

(SEM Photomicrograph)  |—— 1 mm ——|

Fig. 3(b)

(Optical Photomicrograph)  |—— 1 mm ——|

□ : Void Walls

▨ : Cross Section of Void Walls

⋯ : Adhesive Tape

Fig. 6(c)

(Rear Surface)

☐ : Void Walls

▨ : Cross Section of Void Walls

▦ : Side Surface of Sample

Fine carbon particles attached

Fig. 8(a)

(Front Surface)

|—————— 1 mm ——————|

Fig. 8(b)

(Rear Surface)

|—————— 1 mm ——————|

POROUS SINTERED METAL AND FILTER THEREOF, AND METHOD FOR PRODUCING POROUS SINTERED METAL

FIELD OF THE INVENTION

The present invention relates to a porous sintered metal usable for filters for removing particulates from exhaust gases emitted from diesel engines, which are referred to as diesel particulate filters (DPFs), filters for collecting dust from combustion gases emitted from incinerators and thermoelectric power plants, catalyst carriers, liquid carriers, etc., a filter comprising such a porous sintered metal, and a method for producing the porous sintered metal.

BACKGROUND OF THE INVENTION

Heat-resistant honeycombs made of ceramics such as cordierites have conventionally been used as DPFs. However, the ceramic honeycombs are easily broken by vibration or thermal shock. Further, because ceramics have low thermal conductivity, heat spots are locally provided by the combustion of carbon-based particulates trapped in the filter, resulting in cracking and erosion of the ceramic filter. Thus, DPFs made of metals, which are higher in strength and thermal conductivity than ceramics, have been proposed.

For example, a porous metal filter having a three-dimensional network structure is proposed by JP 5-312017 A. This filter is excellent in crack resistance and erosion resistance, and the structure thereof can be more simplified as compared with the honeycombs.

Although the above porous metal body having a three-dimensional network structure is advantageous in resistance to cracking caused by thermal shock and to erosion by a melt, it is poor in a function of capturing particulates. This is because the known porous metal body having a three-dimensional network structure has a thin skeleton with a small surface area, resulting in small chances of contact of particulates with the filter body. Further, because the filter body has a smooth surface, particulates are not so stably captured by the filter body that particulates accumulated on the filter body to some extent easily peel off. It is thus considered that porous metal bodies are low in a capturing rate of particulates, failing to sufficiently capture particulates emitted from engines, thereby releasing a larger proportion of the particulates to the air. To increase a capturing rate, the porous metal bodies need to be made larger and thicker, resulting in too large DPFs for use in automobiles.

OBJECTS OF THE INVENTION

An object of the present invention is to provide a porous sintered metal usable for filters for removing particulates from exhaust gases emitted from diesel engines, filters for collecting dust from combustion gases emitted from incinerators and thermoelectric power plants, catalyst carriers, liquid carriers, etc.

Another object of the present invention is to provide a filter comprising such a porous sintered metal.

A further object of the present invention is to provide a method for producing such a porous sintered metal.

SUMMARY OF THE INVENTION

As a result of intense research in view of the above objects, the inventors have found that by providing a sintered metal body with communicating voids having walls formed with relatively large pores instead of a three-dimensional, thin network structure, its function of capturing particulates is remarkably improved. The present invention has been completed based on this finding.

Thus, the porous sintered metal of the present invention comprises voids at least partially communicating with each other and having walls formed with pores, wherein it has a BET surface area of 700 $cm^2/cm^3$ or more, and wherein an average diameter of the pores is 1 µm or more when measured by a mercury press-in method.

The porosity of the porous sintered metal is preferably 40 to 97%, more preferably 85 to 95%. The porous sintered metal can be suitably used for a filter.

Further, as a result of intensive research on the production of a porous sintered metal, the inventors have found that the above porous sintered metal can be produced by molding a mixture comprising resin particles for forming voids, selectively extracting the resin particles from the resultant green body with a solvent, heating the green body for debinding, and then sintering the debound green body.

Thus, the method for producing a porous sintered metal according to the present invention comprises the steps of blending a metal powder, a binder and resin particles to prepare a mixture in which the resin particles are dispersed; molding the mixture to form a green body; selectively extracting the resin particles from the green body with a solvent; heating the extracted green body for debinding; and sintering the debound green body.

Usable as the resin particles are those soluble in a solvent. The resin particles may be composed of particles easily soluble in a solvent and particles hardly soluble in a solvent. In this case, a volume percentage of the hardly soluble particles is preferably 50% or less based on the total volume (100%) of the easily soluble particles and the hardly soluble particles.

The resin particles may contain a resin component hardly soluble in a solvent with a volume percentage of 50% or less based on the entire volume (100%) of the resin particles. In other words, the resin particles may be made of a mixture of a resin or compound easily soluble in a solvent and a resin hardly soluble in a solvent, a volume percentage of the hardly soluble resin being 50% or less based on the total volume (100%) of the easily soluble resin or compound and the hardly soluble resin.

The metal powder preferably has an average particle size of 200 µm or less, the binder is preferably a cellulose gel, and the resin particles preferably have an average particle size of 0.1 to 10 mm.

In a preferred embodiment, paraffin wax particles are used as the resin particles, and the green body is dried at a temperature lower than the melting point of the paraffin wax particles and subjected to the selective extraction of the paraffin wax particles with a solvent.

In another preferred embodiment, the resin particles are composed of paraffin wax particles and polypropylene particles, a volume percentage of the polypropylene particles being 50% or less based on the total volume (100%) of the paraffin wax particles and the polypropylene particles, and the green body is dried at a temperature lower than the melting point of the paraffin wax particles and then subjected to the selective extraction of the paraffin wax particles with a solvent.

In a further preferred embodiment, the resin particles are made of a mixture of a paraffin wax component and a polypropylene component, a volume percentage of the polypropylene component being 50% or less based on the entire volume (100%) of the resin particles, and the green body is dried at a temperature lower than the melting point of the paraffin wax component and then subjected to the selective extraction of the paraffin wax component with a solvent.

The sintering step is preferably carried out so that the porous sintered metal has a porosity of 40 to 97% and a thickness of 10 mm or more.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

The porous sintered metal of the present invention has a porous structure, in which voids are dispersed, and void walls are formed with pores having a relatively large diameter. In the case of using the porous sintered metal as a filter, the rate of capturing fine substances such as fine carbon particles (particulates) can be effectively improved by increasing an area percentage of portions, with which the fine substances in a gas can be brought into contact when the gas passes through the filter. In the present invention, such portions have not a conventional thin network structure but a surface structure having voids dispersed, thereby having an increased specific surface area. In addition, the formation of pores in the void walls increases the surface roughness of the void walls, thereby further increasing the specific surface area of the filter and thus leading to improvement in the capturing rate.

The porous sintered metal of the present invention can have a specific surface area of 700 $cm^2/cm^3$ or more, which is measured by a BET method (BET surface area), and such a large BET specific surface area cannot be achieved by conventional porous metal bodies with three-dimensional network structures. Such a large BET specific surface area enhances the attaching of fine substances to the porous sintered metal, thereby improving the dust-capturing function. The BET surface area of the porous sintered metal is more preferably 900 $cm^2/cm^3$ or more.

The pores function to increase the specific surface area and surface roughness of the walls, thereby improving the attaching of fine substances. They further make the walls more gas-permeable to enhance a filtration function. The pores formed on the wall surfaces have an average diameter of 1 μm or more when measured by a mercury press-in method. When the average diameter of the pores is less then 1 μm, the particulates-capturing rate is likely to be low. In the case of such a smaller average diameter, the gas hardly passes through the walls but flows along the wall surfaces, so that a large percentage of particulates exit from the filter without being captured. The average diameter is preferably 10 μm or more, more preferably 20 μm or more. On the other hand, in a case where the average diameter of the pores is too large, the porous sintered metal has so reduced strength that it is easily broken under the conditions of extremely variable, high flow rates as in DPFs, etc. In this case, a larger percentage of fine substances pass through the walls, resulting in a reduced particulates-capturing performance. Thus, the average diameter of the pores is preferably 100 μm or less.

The voids formed in the porous sintered metal of the present invention are at least partially communicating with each other.

In the case of using the porous sintered metal as a filter, a gas containing fine substances passes through the porous sintered metal. When the voids are isolated, a gas needs to pass through the walls of the voids. Even though the walls having pores were gas-permeable, the pressure loss of a gas would be too high if the gas can pass through only the pores of the filter. Particularly when the porous sintered metal is used as DPF, etc., the more fine substances such as particulates are captured, the more clogging occurs in pores, resulting in rapid increase in pressure loss. Thus, the voids should be partly or entirely connected. As the communicating voids have larger diameters or are more connected, the pressure loss becomes smaller. Each void acts as a trap for fine substances.

In the present invention, metal materials having higher resistance to vibration or thermal shock and higher thermal conductivity than ceramics are used to prevent the breakage of the filter by vibration or shock. Particularly in the case of using such a metal material for the DPFs, cracking or erosion by heat spots caused by the combustion of particulates can be prevented. The DPFs made of such metal materials are heated by an exhaust gas, and some of them are heated to a particulates ignition temperature of 600° C. or higher for regeneration. Accordingly, the metal material needs to have corrosion resistance at high temperatures. Thus, the metal material is selected depending on use conditions.

The porosity of the porous sintered metal of the present invention is preferably 40 to 97%, more preferably 85 to 95%. When the porosity of the porous sintered metal is less than 40%, the voids are insufficiently connected to increase the pressure loss of a porous sintered metal filter. On the other hand, when the porosity is more than 97%, the porous sintered metal has low strength because of a reduced percentage of wall volumes, and has a reduced function of capturing particulates.

In the porous sintered metal having a thickness of 10 mm, the pressure loss is preferably 1 to 10 kPa when air passes at a flow rate of 5 m/s at 23° C.

The degree of connection of the voids may be evaluated by the pressure loss in a macroscopic sense. When the pressure loss is less than 1 kPa, the voids have such a high degree of connection that fine substances such as particulates are less likely brought into contact with the wall surfaces of such a porous sintered metal used as a filter, resulting in a lower capturing rate. On the other hand, when the pressure loss is more than 10 kPa, the degree of connection of the voids is so low that fine substances rapidly clogs a filter of such a porous sintered metal to increase a pressure loss. In this case, for example, when the porous sintered metal is used as a DPF, an engine output will be reduced.

As described above, the porous sintered metal of the present invention having relatively large pores on void walls has a large specific surface area and thus large gas permeability for filters, catalyst carriers, etc. Further, because the pores in the walls can absorb or maintain a liquid by capillary action or can cause capillary condensation of a vapor such as water vapor, the porous sintered metal of the present invention can be suitably used as absorbers for transporting a fuel from tanks to fuel electrodes in direct methanol fuel cells, members for separating water vapor from a gas The porous sintered metal of the present invention may be produced, for example, by the following method. Metal powder, a binder, and resin particles are basic raw materials. The metal powder constitutes a body of the porous sintered metal, and the binder maintains the strength of a green body in molding and debinding steps. The resin particles form voids in the porous sintered metal. In a case where the porous sintered metal is used for DPFs to be heated and regenerated at 600° C. or higher, the metal powder is preferably made of stainless steel containing 16% or more by mass of Cr, heat-resistant steel containing 1 to 10% by mass of Al and 5 to 30% by mass of Cr, which generates an alumina layer at high temperatures, etc.

The metal powder used in the present invention preferably has an average particle size of 200 μm or less. Too large an average particle size makes the cohesive force of the metal powder insufficient for keeping the shape of the green body, making it likely that the green body is broken after the debinding step. The average particle size of the metal powder is more preferably 100 μm or less. The lower limit of the average particle size of the metal powder is preferably 5 μm to form pores in the walls.

The metal powder, the binder, and the resin particles are blended together to prepare a mixture in which the resin particles are dispersed, and the mixture is then molded. The mixture is molded to a shape substantially similar to the target shape. The green body is then debound by heating and sintered to obtain the porous sintered metal.

In the molding step, it is preferable to apply such a pressure that the resin particles are not crushed to the mixture to increase the contact areas of the resin particles. This increases the diameters of the communicating voids and the degree of connection of the voids in the porous siltered metal.

The resin particles are mixed with the metal powder and the binder to form voids in the porous sintered metal. The resin particles are evaporated in the sintering step, burned off by heating, or extracted from the green body with a solvent before the sintering step. In the production of a porous sintered metal having a large thickness, particularly a thickness of more than 10 mm, the extraction of the resin particles is preferred.

The method of the present invention for producing a porous sintered metal by using a solvent to remove the resin particles is described in detail below.

The method of the present invention is suitable for producing the porous sintered metal having a large thickness for the following reasons. In a case where the resin particles are removed by evaporating, the green body would sometimes be broken or cracked in the debinding step if it contains the resin particles at a high percentage, so that the porous sintered metal is hardly obtained with high porosity and large thickness.

The reason therefor is that the resin particles at a high percentage are melted in the heat-debinding step to generate a large amount of a liquid, or decomposed to generate a large amount of a gas. As the content of the resin particles becomes higher, a structure composed of the metal powder and the binder becomes thinner and weaker in the heat-debinding step, while the amount of a liquid generated in the heat-debinding step becomes larger. The liquid tends to break the green body. Further, the resin generates a large amount of gas when decomposed. Thus, the structure kept only by a small amount of the remaining binder cannot endure the pressure of a gas that escapes through fine gaps, resulting in breakage or cracking of the green body in some cases.

However, when the resin particles are selectively extracted with a solvent before the debinding step, the solid resin particles are replaced by the solvent while maintaining the strength of the green body provided by the binder. Though the solvent replacing the resin particles expands when heated, it easily exits from the green body because of its nature as a liquid, thereby preventing the breakage of the green body. Further, the breakage of the green body may be more effectively prevented, for example, by using a solvent, which is vaporized at temperatures lower then the decomposition temperature of the binder.

The green body is then debound by heating and then sintered to obtain the porous sintered metal with high porosity and large thickness.

In a case where the green body after the resin particles are extracted with a solvent has high porosity and thus is easily deformable, it is preferable to use (a) a combination of first particles soluble in a solvent and second particles hardly soluble in a solvent, or (b) resin particles containing a resin component hardly soluble in a solvent in a suitable amount, to obtain the porous sintered metal with high porosity and large thickness. The second particles or the hardly soluble resin component may remain in the green body after the extraction of soluble components, whereby the integrity of the green body is maintained. The hardly soluble resin may be decomposed and evaporated in the heat-debinding step.

In addition, the use of a solvent to remove the resin particles is advantageous in that both of the resin and the solvent can be recovered by distillation in their proper combinations.

The binder used in the present invention is preferably a cellulose gel such as a gel composed of methylcellulose and water. The cellulose gel is strong and relatively chemically stable in a dry state. The cellulose gel is preferred as the binder, because an extracting solvent hardly erodes the cellulose gel, leaving it sufficiently strong after the extracting step. When the binder contains water, the green body is preferably dried after the molding step.

The resin particles used in the present invention preferably have an average particle size of 0.1 to 10 mm. When the average particle size is less than 0.1 mm, the resin particles are substantially the same as the metal powder in size, failing to exhibit the effect of forming voids. When the average particle size is more than 10 mm, the porous sintered metal has a slim skeleton, thereby exhibiting low strength and being often broken after the heat-debinding step. The average particle size of the resin particles is more preferably 0.1 to 8 mm.

Preferred examples of the resin particles are described below. In the case of using paraffin wax particles as the resin particles, it is preferable to dry the green body at a temperature lower than the melting point of the paraffin wax and then selectively extract the paraffin wax particles from the green body with a solvent. Though the paraffin wax has a low molecular weight and high solvent solubility, it is neither dissolved in nor reacted with the cellulose gel binder in the blending step and the molding step. In addition, the paraffin wax particles have sufficient strength to avoid deformation and are not reacted with the metal powder. Accordingly, the paraffin wax particles are suitable as the resin particles.

In the production method of the present invention, the resin particles should be extracted selectively. Thus, the binder and the resin particles need to be different in solvent solubility. When a resin binder is used together with the resin particles, it is generally difficult to control the extraction with a solvent. However, the extracting step can be carried out with ease, by using a combination of a binder substantially insoluble in a solvent, such as a cellulose binder, and resin particles easily soluble in a solvent, such as paraffin wax particles.

The resin particles may be a mixture of paraffin wax particles and polypropylene particles. The volume percentage of the polypropylene particles is preferably 50% or less based on the total volume (100%) of the paraffin wax particles and the polypropylene particles. In this case, too, it is preferable to dry the green body at a temperature lower than the melting point of the paraffin wax and then selectively extract the paraffin wax particles from the green body with a solvent.

Alternatively, the resin particles may be made of a mixture of paraffin wax and polypropylene. The volume percentage of polypropylene is 50% or less based on the entire volume (100%) of the resin particles. In this case, too, it is preferable that the paraffin wax is selectively extracted from the green body with a solvent after it is dried at a temperature lower than the melting point of the paraffin wax.

The polypropylene particles or component may remain in the green body after the paraffin wax particles or component is extracted with a solvent, thereby maintaining the integrity of the green body. When the volume percentage of the polypropylene particles or component is more than 50%, too much a polypropylene liquid is generated in the heat-debinding step, so that the skeleton (walls of voids) of the debound green body is deformed and broken in some cases.

The above-mentioned method can produce the porous sintered metal having a porosity of 40 to 97% and a thickness of 10 mm or more. The porosity is more preferably 70 to 95%. In the case of using the porous sintered metal as a filter, the porosity is more preferably 85 to 95%.

Porosity, the type of a metal powder used, etc. are selected depending on the use environment and application of the resultant filters as described above, so that the resultant porous sintered metal can be used for diesel particulate filters (DPFs) for treating exhaust gases of automobiles, gas filters, liquid filters, catalyst carriers for reformers for fuel cells, etc.

For example, to improve the heat resistance of the porous sintered metal, the metal powder may be made of a heat-resistant steel containing 1 to 10% by mass of Al and 5 to 30% by mass of Cr, which generates an alumina layer at high temperatures, as described above. When corrosion resistance is important, the metal powder may be made of various stainless steel alloys such as SUS304, SUS316, SUS316L, SUS317, and SUS317L.

In the case of using the porous sintered metal as a carrier for catalysts, etc., the alumina layer is needed in most cases. For example, when the metal powder is made of an Fe—Cr—Al-based alloy, the alumina layer can be formed by the oxidation treatment of the metal powder without adding alumina.

From the structural point of view, the average particle size of the resin particles may be larger than that of the metal powder, so that the porous skeleton composed of the sintered metal powder surrounds large voids obtained by extracting the resin particles on a microscopic scale. Such a structure is preferable to obtain both large surface area and high porosity.

When the resin particles are composed of two types of particles, one having an average particle size of 0.1 to 10 mm and the other having an average particle size of 0.005 to 0.2 mm, the metal powder for forming the skeleton of the porous sintered metal is partly replaced with the smaller resin particles, and portions replaced by the smaller particles are turned to voids finally. In this case, voids formed by the larger resin particles are more likely connected to each other, resulting in decrease in the pressure loss of a gas flowing through the porous sintered metal.

In the present invention, additives may be used in addition to the basic materials, to improve the productivity, etc. For example, by using surfactants, wettability between the resin particles and the metal powder is so increased that extrusion molding to a desired shape can be carried out without suffering from the separation of the resin particles and the metal powder. Examples of such surfactants include polyoxyethylene alkyl ethers, fatty acid alkanol amides, sodium alkyl ether sulfates, etc. Plasticizing agents such as glycerin may be used to improve the moldability of the mixture by extrusion, etc.

The present invention will be explained in more detail with reference to Examples below without intention of restricting the scope of the present invention.

Production of Samples

EXAMPLES 1 and 2

Water-atomized SUS316L powder having an average particle size of 60 μm, commercially available methylcellulose, and irregular paraffin wax particles having an average particle size of 2.5 mm were mixed. Water and a plasticizing agent were added to the mixture and blended. The volume percentage of the paraffin wax particles was 90% based on the total volume (100%) of the SUS316L powder and the paraffin wax particles.

The blended mixture was press-molded to a disc-shaped green body under a pressure of 0.7 MPa by a pressing machine, and dried at 50° C. The paraffin wax particles were then extracted from the green body with n-paraffin as a solvent, and the green body was dried at 90° C. The green body was debound by heating at 600° C. in nitrogen, and sintered in vacuum at 1200° C. Thus, a disc-shaped sample of Example 1 having a thickness of 7 mm and a diameter of 144 mm, and a disc-shaped sample of Example 2 having a thickness of 10 mm and a diameter of 144 mm were produced.

EXAMPLE 3

A blended mixture prepared in the same manner as in Examples 1 and 2 was molded by rolling. The resultant green body was subjected to extraction, drying, heat-debinding and sintering in the same manner as in Examples 1 and 2, to produce a disc-shaped sample having a thickness of 10 mm and a diameter of 144 mm.

COMPARATIVE EXAMPLE 1

A porous Ni—Cr alloy having a three-dimensional network structure was produced by a plating method using a conductive urethane foam as a matrix. The resultant porous metal body was machined to a disc shape having a thickness of 10 mm and a diameter of 144 mm as a sample of Comparative Example 1.

Comparison of Cross Section Structures

Figure 1A:
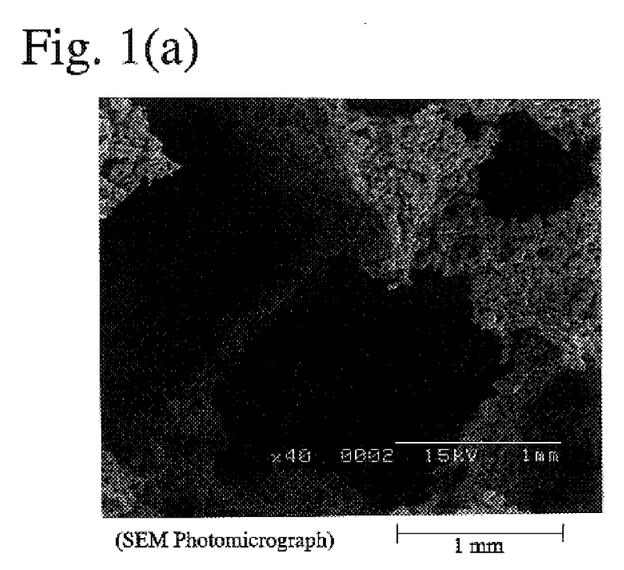
FIG. 1(a) is a scanning electron photomicrograph showing a cross section of the sample of Example 1.
Figure 1B:
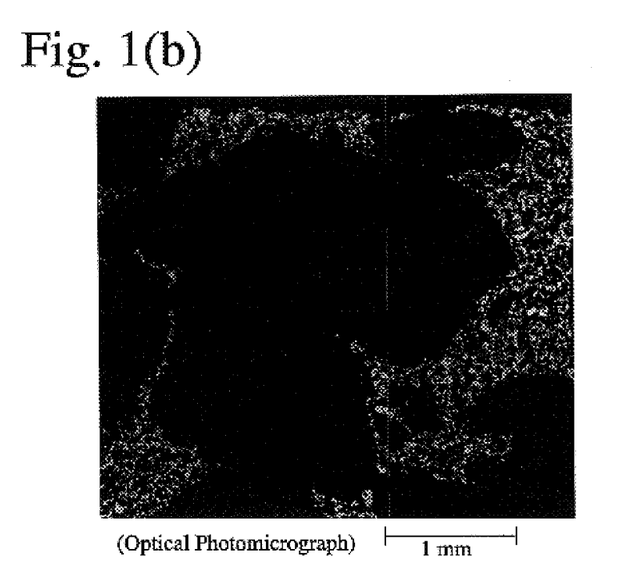
FIG. 1(b) is an optical photomicrograph showing a cross section of the sample of Example 1.
Figure 2A:
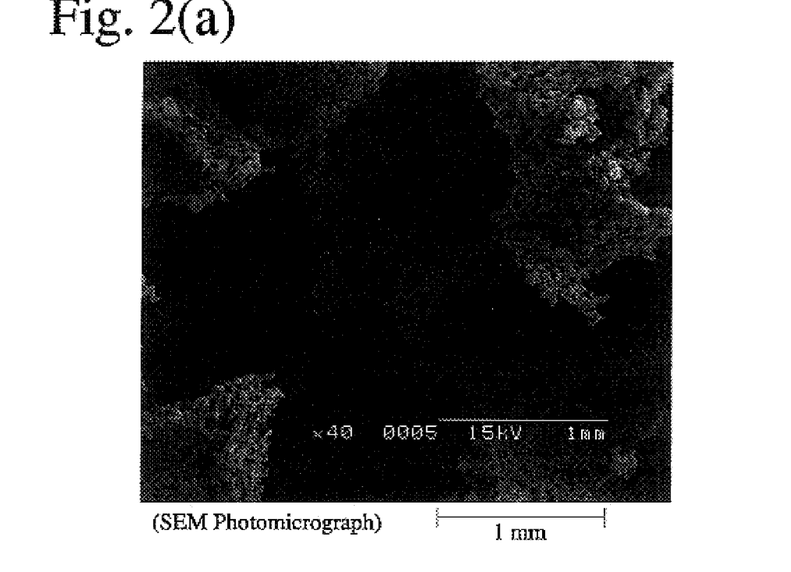
FIG. 2(a) is a scanning electron photomicrograph showing a cross section of the sample of Example 3.
Figure 2B:
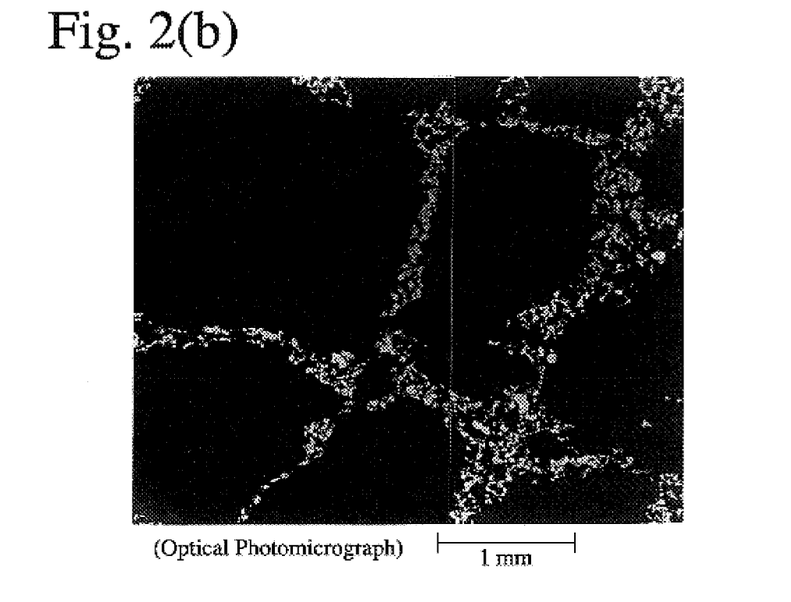
FIG. 2(b) is an optical photomicrograph showing a cross section of the sample of Example 3.
Figure 3A:
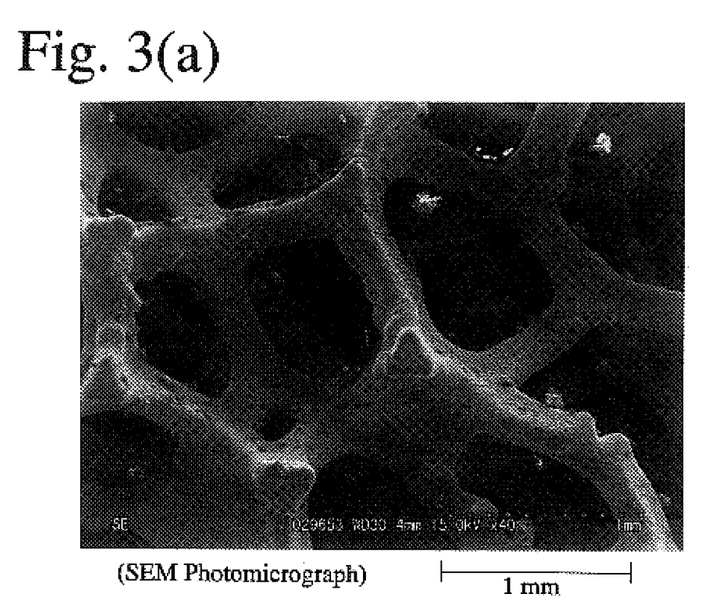
FIG. 3(a) is a scanning electron photomicrograph showing a cross section of the sample of Comparative Example 1.
Figure 3B:
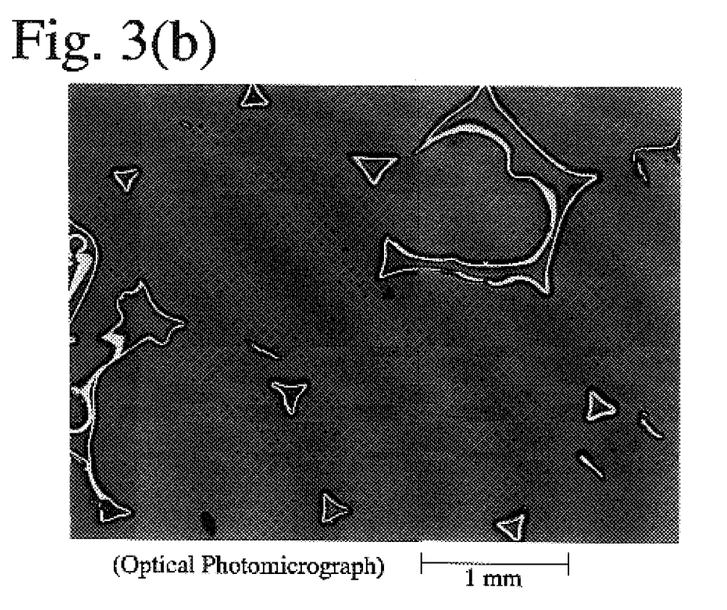
FIG. 3(b) is an optical photomicrograph showing a cross section of the sample of Comparative Example 1.

The cross section structures of samples of Examples 1 and 3 and Comparative Example 1 are shown in scanning electron photomicrographs and optical photomicrographs of FIGS. 1 to 3. The SEM photomicrographs show fracture surfaces of the sample, and the optical photomicrographs show ground surfaces of the sample buried in a resin.

As shown in FIGS. 1(a) and (b), adjacent voids were communicating in the sample of Example 1, and the void walls with recesses, projections and pores were constituted by the sintered metal powder. It was confirmed that the sample of Example 2 had a similar structure.

As shown in FIGS. 2(a) and (b), the sample of Example 3 also had communicating voids with a lower degree of connection than in Example 1. Further, void walls with recesses, projections and pores were constituted by the sintered metal powder as in Example 1.

Unlike the porous sintered metals of Examples 1 to 3, the sample of Comparative Example 1 had a hollow structure with a thin skeleton and a smooth surface without pores.

Comparison of Surface Area, Etc.

The samples of Examples 1 to 3 and Comparative Example 1 were measured with respect to a surface area per a unit volume (BET surface area), the average diameter of pores, porosity, and the pressure loss of air flowing therethrough. The surface area was measured by a BET method, the average diameter of pores was measured by a mercury press-in method, and the pressure loss was determined from a pressure difference measured when the air flowed through each sample at a flow rate of 5 m/s at 23° C.

The sample of Comparative Example 1 having smooth surfaces was not measured with respect to the average diameter of pores. The BET surface area was determined by measuring a specific surface area per 1 g of the porous sintered metal by a BET method and converting it to a specific surface area per 1 cm$^3$ by using the porosity. Further, because the sample of Comparative Example 1 had a hollow structure, the BET surface area thereof was corrected by subtracting the surface area of the hollow portions, which did not contribute to a filtering performance, from the total surface area on image data of the cross section structure. The results are shown in Table 1.

TABLE 1

| No. | BET Surface Area (cm$^2$/cm$^3$) | Average Diameter of Pores (μm) | Porosity (%) | Pressure Loss[1] (kPa) |
|---|---|---|---|---|
| Example 1 | 910 | 28.8 | 90.5 | 3.14 |
| Example 2 | 1,260 | 28.3 | 87.5 | 6.76 |
| Example 3 | 1,180 | 29.4 | 88.3 | 10.02 |
| Comparative Example 1 | 530 | — | 93.2 | 0.35 |

Note:
Measured at 5 m/s.

Each sample of Examples 1 to 3 had porosity substantially equal to that of Comparative Example 1, and a specific surface area substantially twice as large as that of Comparative Example 1. Further, it is clear from the above-described cross section structures and the results shown in Table 1 that smaller pressure loss was obtained by a higher degree of void connection and a thinner porous skeleton in the present invention.

The pressure loss of Comparative Example 1 was remarkably smaller than that of Examples 1 to 3. This result seemed to be due to the fact that the elongated smooth skeleton of Comparative Example 1 had lower resistance to gas flow than that of the porous structures of Examples 1 to 3.

Evaluation of Filtering Performance

Each sample of Examples 1 to 3 and Comparative Example 1 was evaluated as a filter with respect to the relations between the amount of fine carbon particles charged and pressure loss at various rates of capturing the fine carbon particles.

(1) Evaluation Procedure

Figure 4:
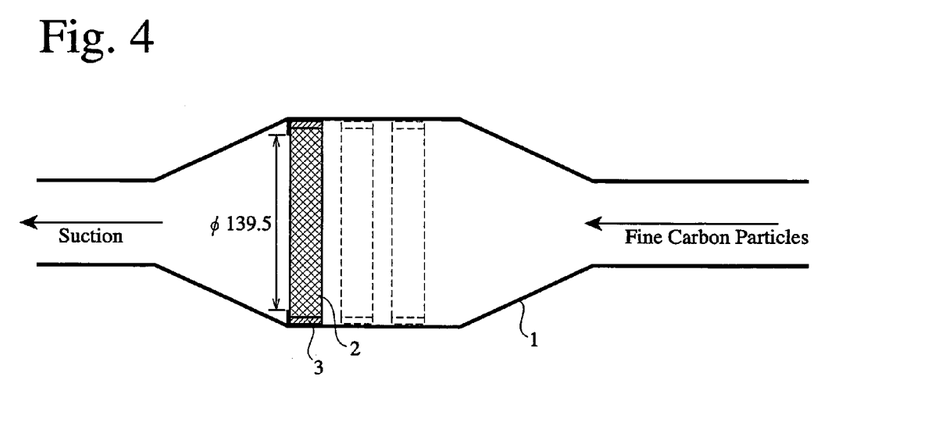
FIG. 4 is a schematic view showing a procedure for evaluating the filtering performance of a sample.

A sample 2 dried at 130° C. for 2 hours and weighed in advance was set in a holder 1 via a sealing member 3 as shown in FIG. 4. Suction was conducted on one side of the holder 1 to have a uniform flow rate of 5 m/s, while fine carbon particles having an average particle size of 0.042 μm were charged on the other side at a rate of 0.1 g/min, to observe the change of pressure loss relative to the amount of fine carbon particles charged. Each sample had a diameter of 139.5 mm in a portion, through which air flowed. The pressure loss was obtained from the pressure difference between both ends of the sample. The test was carried out in a room at a temperature controlled to 23° C.

The test ended when the flow rate became unable to be controlled uniformly at 5 m/s, and the sample was taken out of the holder 1. The sample was dried at 130° C. for 2 hours and weighed, and the amount of captured fine carbon particles was determined from weight increase of the sample. The amount of the captured fine carbon particles was divided by the total amount of the fine carbon particles charged in the test, to determine a capturing rate. Further, the condition of attaching the fine carbon particles to the sample was also observed.

(2) Results of Evaluation

Figure 5:
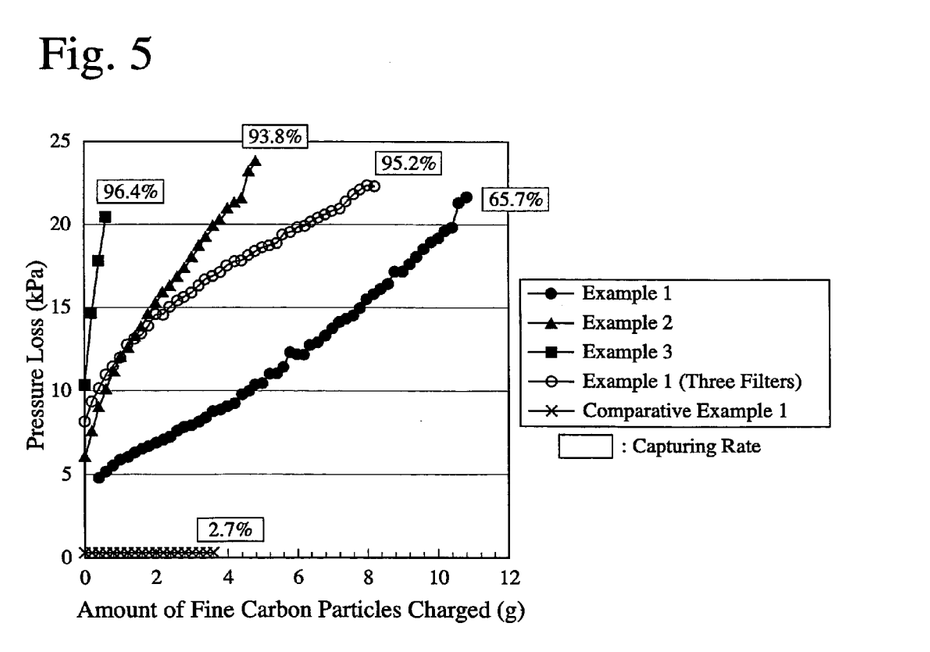
FIG. 5 is a graph showing the relations between the amount of fine carbon particles charged and pressure loss at various capturing rates in the samples of Examples 1–3 and Comparative Example 1.

The relations between the amount of fine carbon particles charged and pressure loss in each sample are shown in FIG. 5 at various fine carbon particles-capturing rates shown in Table 2.

TABLE 2

| Sample | Example 1 | Example 2 | Example 3 | Example 2 | Comparative Example 1 |
|---|---|---|---|---|---|
| Thickness (mm) | 7 | 10 | 10 | 10 | 10 |
| Number of Filters | 1 | 1 | 1 | 3 | 1 |
| Capturing Rate (%) | 65.7 | 93.8 | 96.4 | 95.2 | 2.7 |

The comparison of the samples of Examples 2 and 3 having the same thickness of 10 mm indicates that the sample of Example 2 with a higher degree of void connection had lower pressure loss, while the sample of Example 3 with a lower degree of void connection had a higher capturing rate.

The comparison of the 7-mm-thick sample of Example 1 with the 10-mm-thick sample of Example 2 indicates that the sample of Example 1 with a smaller thickness had lower pressure loss, while the sample of Example 2 with a larger thickness had a higher capturing rate.

When three samples of Example 1 each having a thickness of 7 mm were arranged in the holder 1 with a gap of 3 mm as shown in FIG. 4, the capturing rate was as high as 95.2% nearly equal to that of Example 3, though the pressure loss was lower than that of Example 3.

It is thus clear that the pressure loss and the particulates-capturing rate can be controlled by changing the degree of void connection and thickness of each porous sintered metal, and the number of porous sintered metal filters.

As compared with the samples of Examples 1 to 3, the sample of Comparative Example 1 had an extremely lower capturing rate of 2.7%, though it did not suffer from increase in pressure loss even if more fine carbon particles are charged. It is presumed that an extremely larger thickness is needed to make the porous metal body of Comparative Example 1 equal to the porous sintered metals of Examples 1 to 3 in a capturing rate. This inevitably makes the porous metal body of Comparative Example 1 extremely voluminous when used as a filter needing a high capturing rate.

Figure 6A:
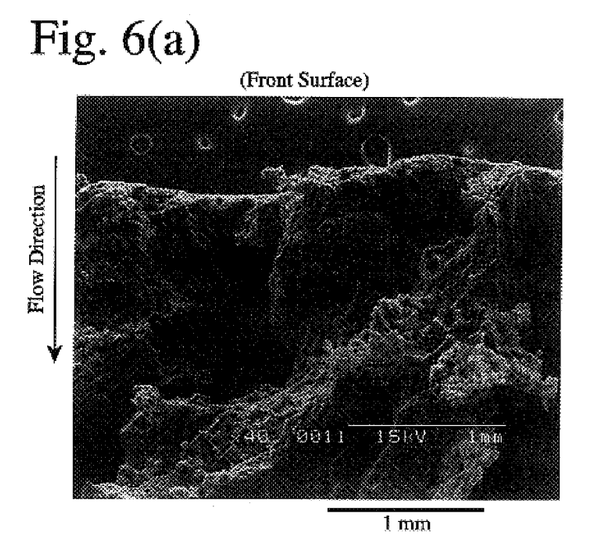
FIG. 6(a) is a scanning electron photomicrograph showing fine carbon particles attached to the sample of Example 1 on the inlet side (front surface) after the capturing test.
Figure 6B:
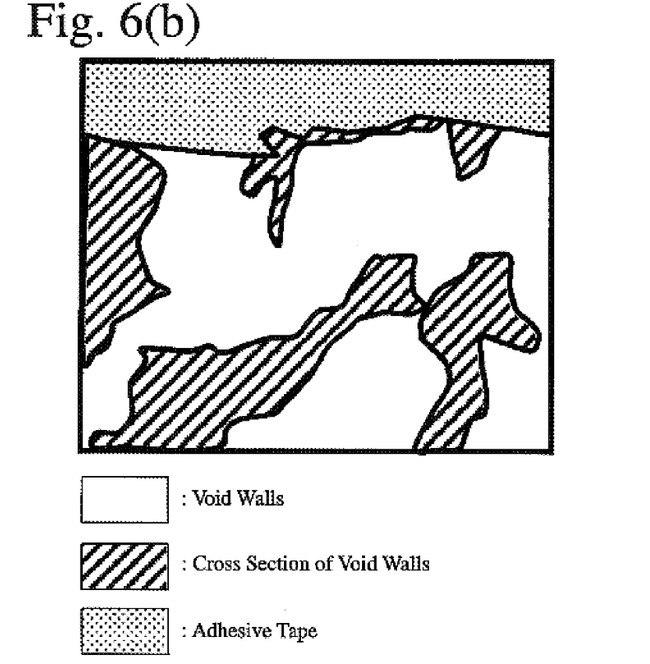
FIG. 6(b) is a schematic view corresponding to FIG. 6(a)
Figure 6C:
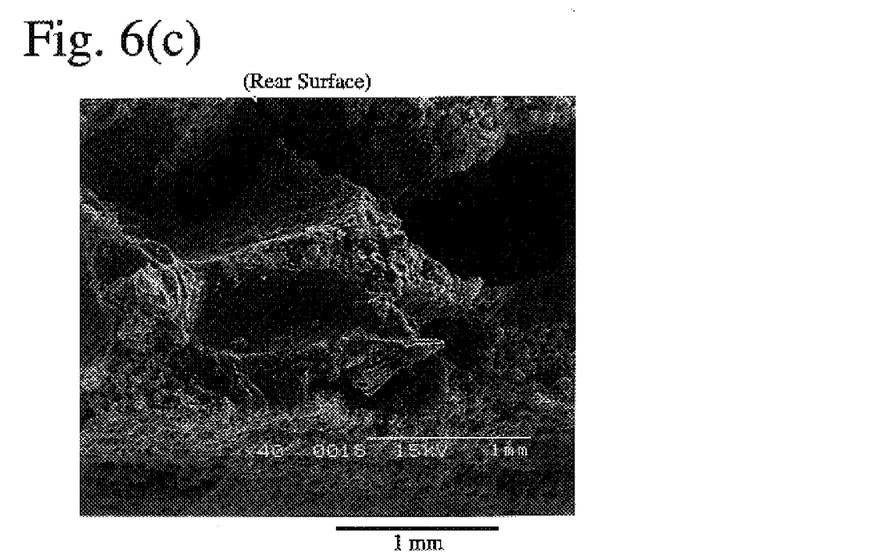
FIG. 6(c) is a scanning electron photomicrograph showing fine carbon particles attached to the sample of Example 1 on the exit side (rear surface) after the capturing test.
Figure 6D:
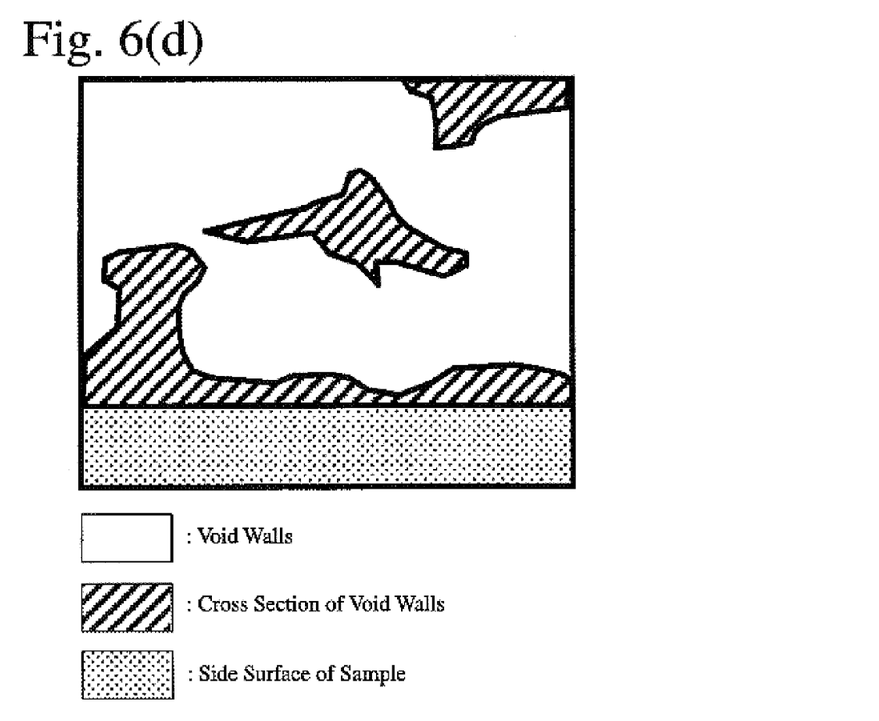
FIG. 6(d) is a schematic view corresponding to FIG. 6(c)
Figure 7A:
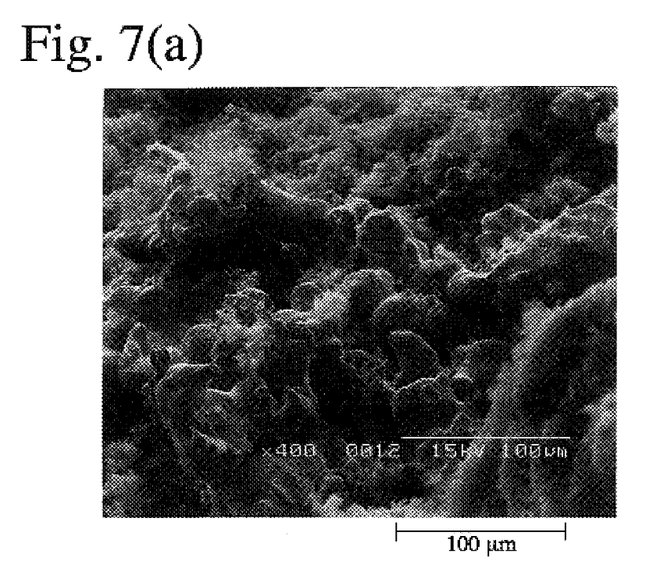
FIG. 7(a) is a scanning electron photomicrograph showing fine carbon particles attached to void walls of the sample of Example 1.
Figure 7B:
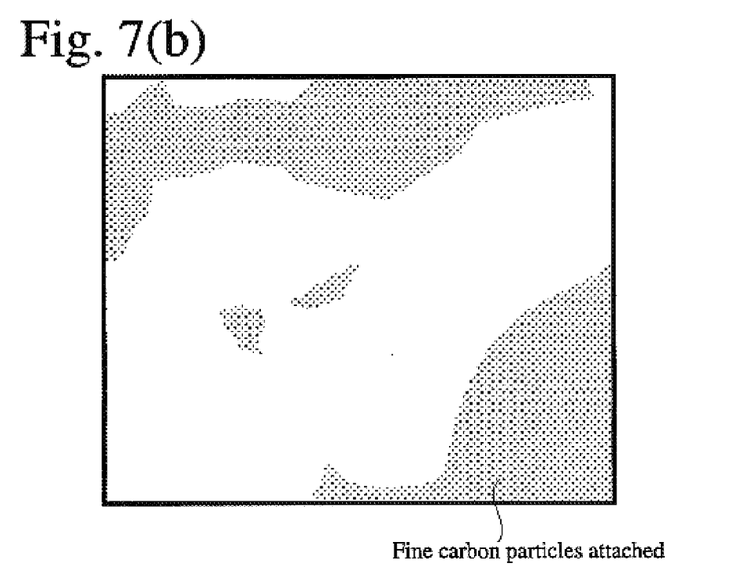
FIG. 7(b) is a schematic view corresponding to FIG. 7(a)
Figure 8A:
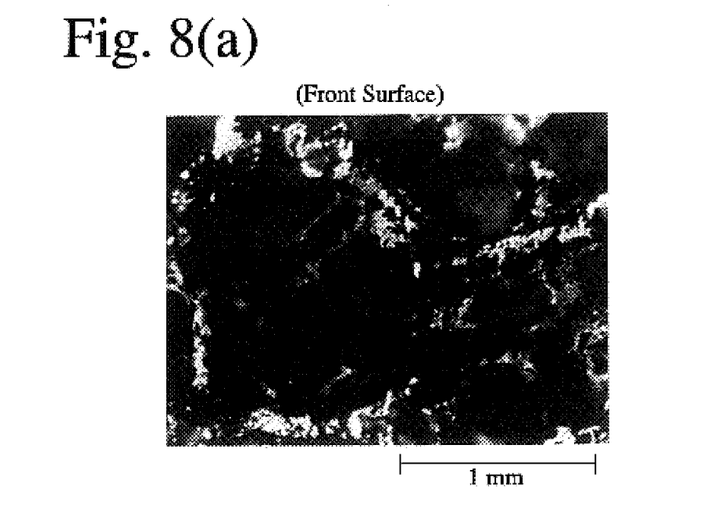
FIG. 8(a) is an optical photomicrograph showing fine carbon particles attached to the sample of Comparative Example 1 on the inlet side after the capturing test.

FIG. 6(a) is a SEM photomicrograph showing a fracture surface of the 7-mm-thick sample of Example 1 on the fine carbon particles-charging side (front surface), and FIG. 6(b) is a SEM photomicrograph showing a fracture surface of the 7-mm-thick sample of Example 1 on the fine carbon particles-exiting side (rear surface). FIGS. 6(b) and (d) are schematic views each corresponding to FIGS. 6(a) and (c), respectively. FIG. 7(a) is a SEM photomicrograph showing a fracture surface of the 7-mm-thick sample of Example 1, in which fine carbon particles are deposited on void walls, and FIG. 7(b) is a schematic view corresponding to FIG. 7(a). FIGS. 8(a) and (b) are optical photomicrographs showing the internal skeleton of the sample of Comparative Example 1 on both front and rear surfaces.

As is clear from FIGS. 6(a)–(d), fine carbon particles were deposited on the void walls facing a flow of the fine carbon particles in the sample of Example 1 from a front surface to a rear surface. In FIG. 7, white-looking particles are fine carbon particles. It was confirmed that the fine carbon particles were deposited not only on the walls of the communicating voids but also in pores opening on the void walls in the sample of Example 1.

Figure 8B:
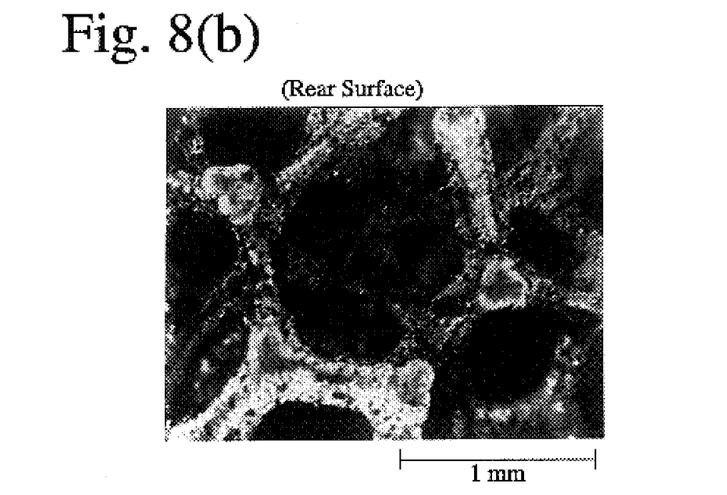
FIG. 8(b) is an optical photomicrograph showing fine carbon particles attached to the sample of Comparative Example 1 on the outlet side after the capturing test.

As shown in FIG. 8, in the sample of Comparative Example 1, fine carbon particles were attached to the elongated smooth skeleton on a front side, and some portions of the skeleton on a front side were free from fine carbon particles.

It is thus clear that voids act as a trap for fine carbon particles in the porous sintered metal of the present invention, and that void walls with pores contribute to capturing fine carbon particles. Because of a sufficient area and large roughness on void walls, fine carbon particles are captured more stably in the porous sintered metal of the present invention than in the porous metal body of Comparative Example 1.

On the other hand, the porous metal body of Comparative Example 1 has a thin skeleton, with which fine carbon particles are brought into contact, so that the amount of fine carbon particles attached thereto is rapidly saturated. When reached to some degree, the attached fine carbon particles easily peel off because of the smooth skeleton surface. Thus, the fine carbon particles-capturing rate is inevitably low despite of the uniformly low pressure loss regardless of the amount of the fine carbon particles charged.

EXAMPLE 4

Water-atomized SUS316L powder having an average particle size of 60 μm, commercially available methylcellulose, and spherical paraffin wax particles having an average particle size of 1,000 μm were mixed. Water and a plasticizing agent were added thereto, and the resultant mixture was blended. The volume percentage of the paraffin wax particles was 80% or 90% based on the total volume (100%) of the SUS316L powder and the paraffin wax particles, to prepare two blended mixtures.

Each blended mixture was extrusion-molded to a plate-shaped green body, which was cut to a size of 80 mm in diameter and 15 mm in thickness, and dried at 50° C. The green body was soaked in n-paraffin at 70° C. to extract the paraffin wax particles, and then dried at 80° C. The percentage of the paraffin wax particles extracted was approximately 90%. The green body was then heated in Ar at a heating rate of 50° C./H in a heat-debinding furnace, and kept at 900° C. for 2 hours. Thus, the remaining paraffin wax particles and the methylcellulose were decomposed and evaporated. The retention temperature was controlled to 900° C., whereby the green body was easily transferred from the heat-debinding furnace to a sintering furnace with excellent handling. The debound green body was sintered in vacuum at 1200° C. for 2 hours in the sintering furnace.

Figure 9:
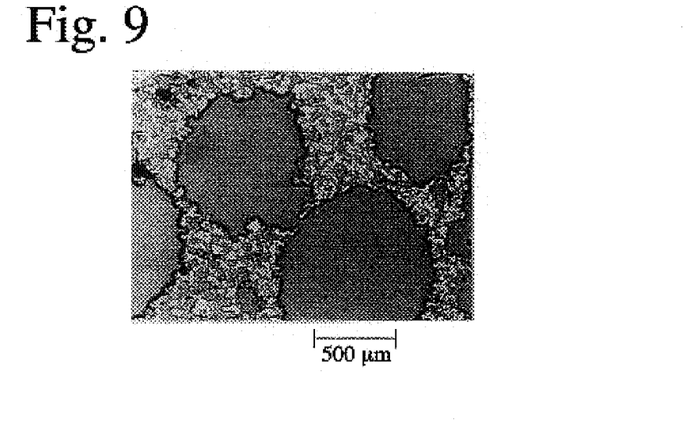
FIG. 9 is an optical photomicrograph showing a cross section of one example of porous sintered metals produced by the method of the present invention.
Figure 10:
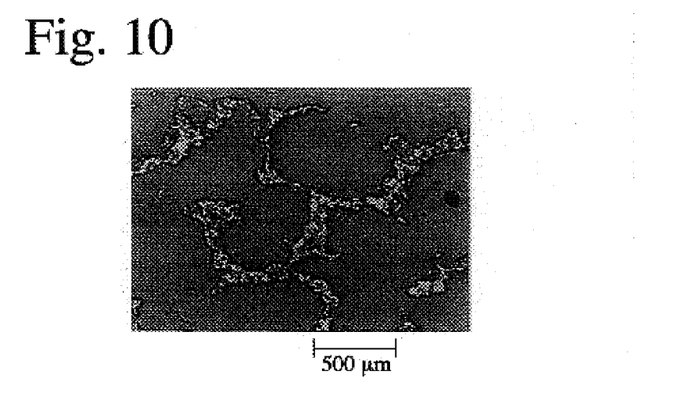
FIG. 10 is an optical photomicrograph showing a cross section of another example of porous sintered metals produced by the method of the present invention.

The cross sections of two porous sintered metals thus obtained are shown in the photomicrographs of FIGS. 9 and 10. In FIGS. 9 and 10, white portions represent metal portions, and mast dark portions represent voids and pores. As shown in FIGS. 9 and 10, spherical voids having an average particle size of about 1,000 μm equal to that of the paraffin wax particles and pores were observed between the metal particles. The porosities of the porous sintered metals were 84% and 90%, respectively. Both porous sintered metals had a thickness of 11.5 mm.

EXAMPLE 5

Water-atomized SUS316L powder having an average particle size of 10 μm, the same methylcellulose as in Example 4, spherical paraffin wax particles having an average particle size of 1,000 μm, and irregular polypropylene particles having an average particle size of 150 μm were mixed. Water and a plasticizing agent were added thereto, and the resultant mixture was blended. The volume percentage of the paraffin wax particles added was 60%, and the volume percentage of the polypropylene particles added was 12.5%, based on the total volume (100%) of the SUS316L powder, the paraffin wax particles and the polypropylene particles.

The blended mixture was extrusion-molded to a plate-shaped green body, cut to a size of 80 mm in diameter and 15 mm in thickness, and dried at 50° C. The paraffin wax particles were extracted in the same manner as in Example 4. The extracted green body was heated to 350° C. at a heating rate of 50° C./H, heated from 350° C. to 500° C., which temperature range included the decompose temperature of polypropylene, at a heating rate of 30° C./H, heated from 500° C. to 900° C. at a heating rate of 75° C./H, and kept at 900° C. for 2 hours for debinding. The debound green body was sintered in vacuum at 1100° C. for 2 hours in the sintering furnace, to produce a porous sintered metal.

Figure 11:
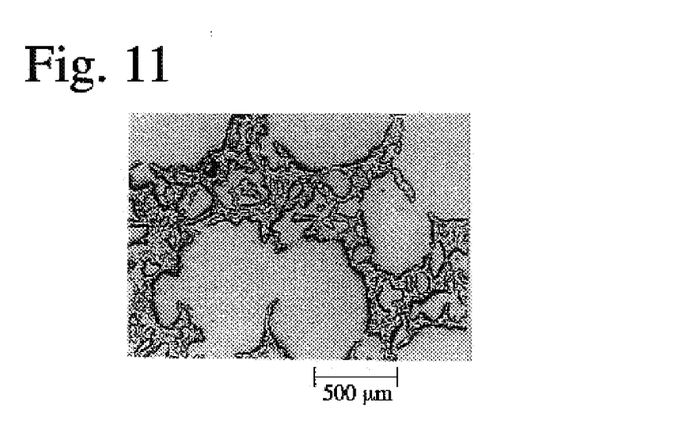
FIG. 11 is an optical photomicrograph showing a cross section of a further example of porous sintered metals produced by the method of the present invention.

A cross section of the porous sintered metal thus obtained is shown in FIG. 11. In FIG. 11, white portions occupying a most area represent voids and pores. Voids having the same shapes as those of the paraffin wax particles and the polypropylene particles and pores between the metal particles were observed as in Example 4. The porous sintered metal had a porosity of 91% and a thickness of 11.3 mm.

EXAMPLE 6

Water-atomized SUS316L powder having an average particle size of 60 μm, the same methylcellulose as in Example 4, and irregular resin particles having an average particle size of 1,000 μm were mixed. The irregular resin particles were prepared by mixing a paraffin wax and polypropylene in a proportion of 1:1 by mass at 170° C., cooling the resultant molten mixture to a solid mixture and pulverizing the solid mixture. Water and a plasticizing agent were added to a mixture of the SUS316L powder, methylcellulose and the resin particles, and blended. The volume percentage of the resin particles was 80% based on the total volume (100%) of the SUS316L powder and the resin particles.

The blended mixture was extrusion-molded to a plate-shaped green body, cut to a size of 80 mm in diameter and 15 mm in thickness, and dried at 50° C. The paraffin wax was extracted, and the green body was debound by heating in the same manner as in Example 5. The debound green body was sintered in vacuum at 1200° C. for 2 hours in the sintering furnace, to produce a porous sintered metal.

In the porous sintered metal thus obtained, voids having the same shapes as those of the resin particles and pores between the particles were observed as in Example 4. The porous sintered metal had a porosity of 84% and a thickness of 11.5 mm.

COMPARATIVE EXAMPLE 2

Water-atomized SUS316L powder having an average particle size of 60 μm, commercially available methylcellulose, and spherical polyethylene particles having an average particle size of 600 μm were mixed. Water and a plasticizing agent were added thereto, and the resultant mixture was blended. The volume percentage of the polyethylene particles was 80% based on the total volume (100%) of the SUS316L powder and the polyethylene particles.

The blended mixture was extrusion-molded to a plate-shaped green body, cut to a size of 80 in diameter and 15 mm in thickness, and dried at 80° C. The extracted green body was heated to 350° C. at a heating rate of 50° C./H, heated from 350° C. to 500° C., which temperature range included the decompose temperature of polyethylene, at a heating rate of 30° C./H, heated from 500° C. to 900° C. at a heating rate of 75° C./H, and kept at 900° C. for 2 hours, in Ar in a heat-debinding furnace.

The observation of the changes of the green body in the temperature elevation process in the heat-debinding step revealed that the green body was already broken at 350° C. by melting of polyethylene.

The porous sintered metal of the present invention is usable for filters with a high rate of capturing fine substances such as particulates. Further, because the porous sintered metal is gas-permeable and has relatively large pores and a large specific surface area, it is suitably usable for catalyst carriers. In addition, because pores on the void walls can attract and hold a liquid by a capillary action, causing the capillary condensation of a vapor such as water vapor, the porous sintered metal can be suitably used as liquid absorbers, liquid preservers, members for separating water vapor from various gases.

What is claimed is:

1. A method for producing a porous sintered metal, comprising the steps of blending a metal powder, a binder and resin particles to prepare a mixture in which said resin particles are dispersed; molding said mixture to provide a green body; selectively extracting said resin particles from said green body with a solvent; debinding the extracted green body by heating; and sintering the debound green body.

2. The method for producing a porous sintered metal according to claim 1, wherein said resin particles are composed of first particles soluble in a solvent and second particles hardly soluble in a solvent, a volume percentage of said second particles being 50% or less based on the total volume (100%) of said first and second resin particles.

3. The method for producing a porous sintered metal according to claim 1, wherein said resin particles contain a resin component hardly soluble in a solvent, a volume percentage of said resin component being 50% or less based on the entire volume (100%) of the resin particles.

4. The method for producing a porous sintered metal according to claim 1, wherein said metal powder has an average particle size of 200 μm or less, and said binder is a cellulose gel, and said resin particles have an average particle size of 0.1 to 10 mm.

5. The method for producing a porous sintered metal according to claim 1, wherein paraffin wax particles are used as said resin particles; and wherein said green body is dried at a temperature lower than the melting point of said paraffin wax particles and subjected to the selective extraction of said paraffin wax particles with a solvent.

6. The method for producing a porous sintered metal according to claim 2, wherein said resin particles are composed of paraffin wax particles and polypropylene particles, a volume percentage of said polypropylene particles being 50% or less based on the total volume (100%) of said paraffin wax particles and said polypropylene particles; and wherein said green body is dried at a temperature lower than the melting point of said paraffin wax particles and then subjected to the selective extraction of said paraffin wax particles with a solvent.

7. The method for producing a porous sintered metal according to claim 3, wherein said resin particles are made of a mixture of a paraffin wax component and a polypropylene component, a volume percentage of said polypropylene component being 50% or less based on the entire volume (100%) of the resin particles; and wherein said green body is dried at a temperature lower than the melting point of said paraffin wax component and then subjected to the selective extraction of said paraffin wax component with a solvent.

8. The method for producing a porous sintered metal according to claim 1, wherein the sintering step is carried out so that said porous sintered metal has a porosity of 40 to 97% and a thickness of 10 mm or more.

9. The method for producing a porous sintered metal according to claim 1, wherein the sintering step is carried out so that said porous sintered metal has a porosity of 40 to 97%.

10. The method for producing a porous sintered metal according to claim 1, wherein said porous sintered metal comprises voids fomied by removing said resin particles for farming voids.

11. The method for producing a porous sintered metal according to claim 1, wherein the sintering step is carried out so that said porous sintered metal has a porosity of 40 to 97%, and wherein said porous sintered metal comprises voids formed by removing said resin particles for forming voids.

* * * * *